United States Patent [19]

Frank

[11] 4,422,612

[45] Dec. 27, 1983

[54] DEVICE FOR SUPPORTING A MOVEABLE SEAT, FOR EXAMPLE IN A MOTOR VEHICLE

[75] Inventor: Simon Frank, Watterdingen, Fed. Rep. of Germany

[73] Assignee: Swiss Aluminium Ltd., Chippis, Switzerland

[21] Appl. No.: 382,901

[22] Filed: May 28, 1982

[30] Foreign Application Priority Data

Jun. 4, 1981 [DE] Fed. Rep. of Germany ....... 3122124

[51] Int. Cl.³ ............................................. F16M 13/00
[52] U.S. Cl. .................................... 248/430; 248/393; 248/544
[58] Field of Search ............... 248/393, 394, 395, 396, 248/429, 430, 424, 544; 297/330, 344, 346; 296/65 R

[56] References Cited

U.S. PATENT DOCUMENTS

| 3,321,090 | 5/1967 | Greenstadt | 211/162 |
| 3,524,677 | 8/1970 | Louton | 248/430 X |
| 3,620,495 | 11/1971 | Korab | 248/430 |
| 4,204,658 | 5/1980 | Courtois | 248/430 |

FOREIGN PATENT DOCUMENTS

| 244137 | 1/1961 | Australia | 248/430 |
| 1430916 | 11/1968 | Fed. Rep. of Germany | 296/65 R |
| 2449549 | 10/1980 | France | 248/430 |
| 942976 | 11/1963 | United Kingdom | 248/429 |
| 986863 | 3/1965 | United Kingdom | 248/429 |
| 2014444 | 8/1979 | United Kingdom | 248/430 |

Primary Examiner—J. Franklin Foss
Attorney, Agent, or Firm—Bachman and LaPointe

[57] ABSTRACT

A device for supporting a moveable seat, for example a seat in a motor vehicle, by means of sliding rails which can be displaced in their longitudinal direction on roller facilities situated between the sliding rails and stationary alignment rails, the position of the seat being set by a mechanism which arrests the movement of the seat and involves, if desired, notches on at least one alignment rail, made such that it can withstand excessive loading, at the same time being simple and inexpensive to manufacture and install. This is achieved by having both the sliding rail and the related alignment rail feature at least one flange projecting out at the side, such that the flange on the sliding rail lies a short distance below the flange on the alignment rail resulting in flanges coming into contact under overload conditions. The facing flanges feature surface projections which interlock when under load.

6 Claims, 7 Drawing Figures

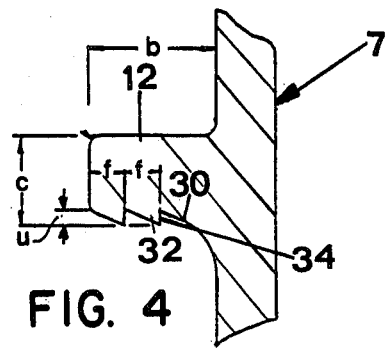
FIG. 4
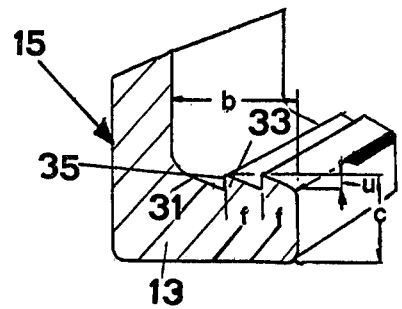
FIG. 5
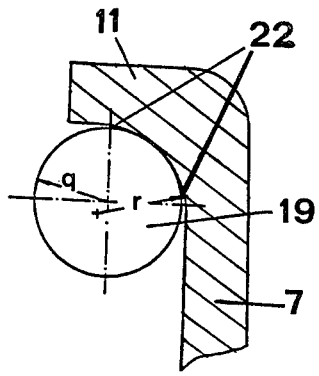
FIG. 6
FIG. 7
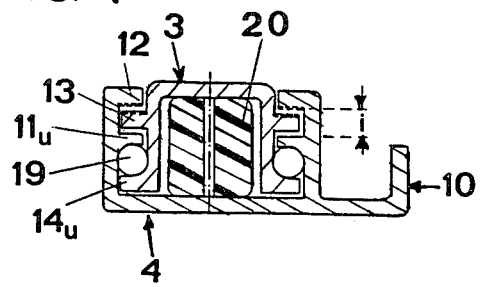

DEVICE FOR SUPPORTING A MOVEABLE SEAT, FOR EXAMPLE IN A MOTOR VEHICLE

BACKGROUND OF THE INVENTION

The present invention relates to a device for supporting a moveable seat, for example in a motor vehicle, by means of sliding rails which can be displaced in their longitudinal direction on roller facilities between the sliding rails and stationary alignment rails, the position of the seat being adjustable by a mechanism which arrests the movement of the seat and involves, if desired, notches on at least one alignment rail.

Known devices of this kind comprise a steel sheet channel which provides the means of arresting seat movement and which resides in a steel sheet alignment rail open at the top. A steel sheet section which opens downwards is placed in this alignment rail from above and can move on inserted balls. Especially in the case where safety belts are attached to the seat it has recently been found that this type of rail arrangement is not adequate if overloaded; for example, in a collision the sliding rail is lifted out of the alignment rail, and with it the seat.

In view of the above, it is the principal object of the present invention to develop a rail arrangement of the kind mentioned at the start which is able to withstand a high degree of loading and which is simple and inexpensive to manufacture and install.

SUMMARY OF THE INVENTION

The foregoing object is achieved by way of the present invention wherein both the sliding rail and the related alignment rail feature at least one flange projecting out the side such that the flange on the sliding rail lies a short distance below the flange on the alignment rail resulting in the flanges coming into contact under conditions of overloading. Furthermore the facing flanges may feature projections which interlock under conditions of overloading.

The rail arrangement according to the present invention is made of two easily extruded sections which can fit tightly in each other while still being able to provide sliding movement. A part of the lower, alignment rail is shaped to provide the means of arresting seat movement thereby eliminating the previous need for three parts.

Below the longitudinal flanges on the sidewalls of the alignment rail are lower end flanges or the like on the sliding rail so that upward movement is no longer easily possible. Such side flanges or the like on conventional rail arrangements rest against the ball bearings and, when subjected to loading, slide past the ball bearings. The wall flanges, lower end flanges and the like are separate from and independent of the ball bearing facilities.

Another feature of the invention are the projections standing out from the surface of the section flanges which are hook or tooth like in cross section and arranged such that the upright faces of those projections on the sliding rail can engage the corresponding faces of the projections on the alignment rail thereby providing additional security against vertical, upwards movement. The tooth-like parts interlock and provide additional resistance. This happens when the upright face of the projections on the alignment rail and/or sliding rail is directed towards the neighboring section wall.

It is also within the scope of the invention to provide a further wall flange and end flange on the respective sidewalls of the sliding rail and alignment rail respectively, parallel to the related end flange and wall flange bearing the projections, between which further flange roller facilities are provided. It is preferred that the transition between the sidewall and end flange or the like be in the form of a curved bearing surface and that the radius of the roller ball to the radius of the bearing surface is 1:1 to 1:3.

BRIEF DESCRIPTION OF THE DRAWINGS

Further objects and advantages of the present invention are revealed with the aid of the following drawings wherein:

FIG. 4 is an enlargement of part of the section shown in FIG. 2.

FIG. 5 is a perspective view of a sectioned part from FIG. 2.

FIG. 6 is a cross-sectional view through another part of the rail mechanism shown in FIG. 2.

FIG. 7 is another example of the rail mechanism, viewed as that example in FIG. 2.

DETAILED DESCRIPTION

Figure 1:
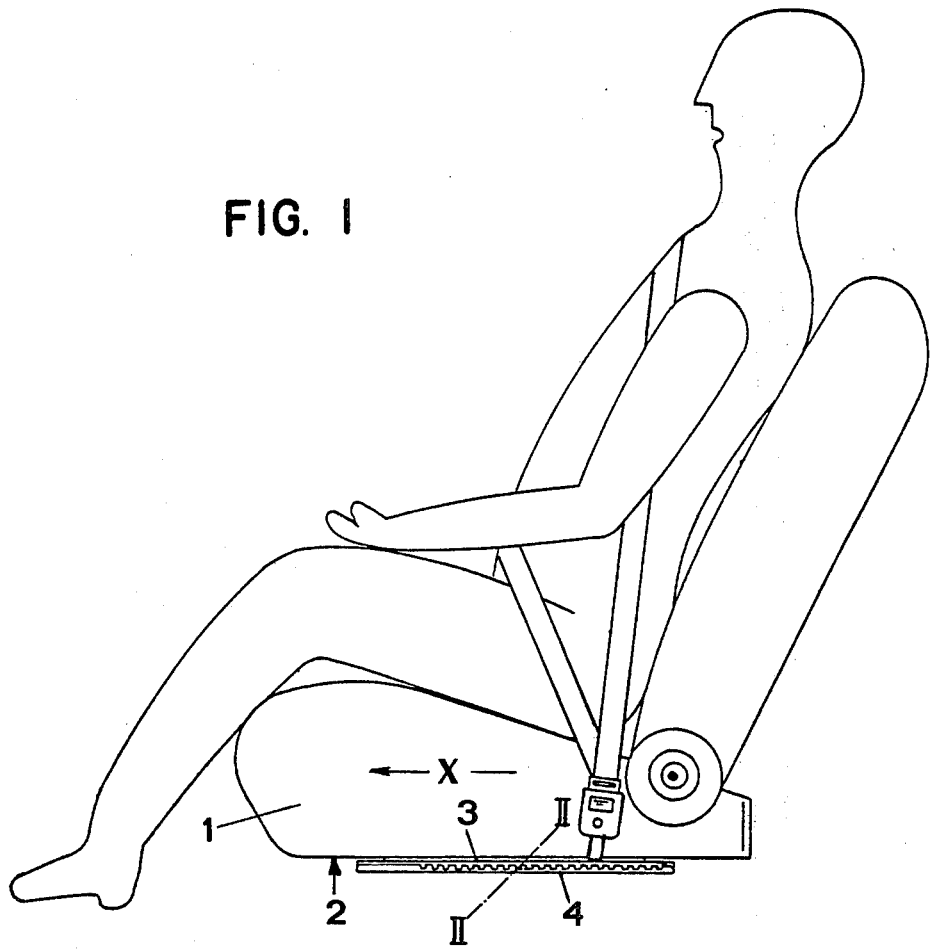
FIG. 1 is a schematic end view of a passenger seat on a rail-type support.
Figure 2:
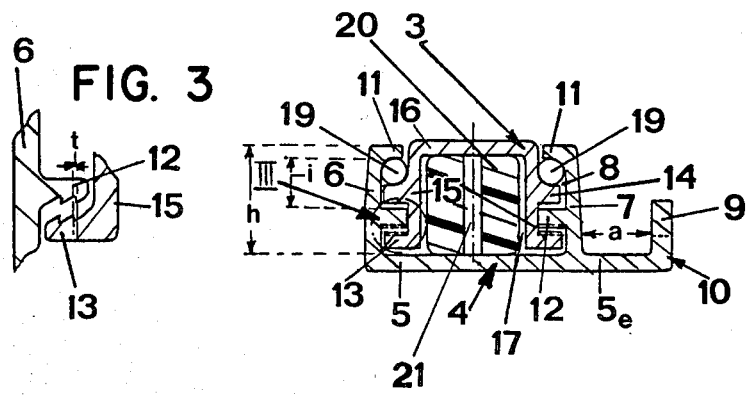
FIG. 2 is a cross-sectional view through the rail support along line II—II in FIG. 1.

A passenger seat 1 of a motor car, which is not shown here, is fitted with sliding rail 3 on the seat base 2; these rails 3 are mounted in alignment rails 4 secured to the vehicle floor, and can be displaced in the direction x from the end position shown in FIG. 1. Each sliding rail 3, together with its alignment rail 4, forms a rail support 40 for the passenger seat 1.

The alignment rail 4 is made from a basically U-shaped section featuring a base plate 5 and upright walls 6, 7 delimiting a channel 8 which is open at the top. The base plate 5, however, extends beyond the right wall 7, and the extension $5_e$ of the base comes, at a distance from wall 7, a strip 9 running parallel to wall 7. The angular section 10 made up of strip 9 and extension $5_e$ is designed as a retainment facility for a mechanism, not shown, to arrest the movement of the seat 1 on adjusting its position.

At the top of sidewalls 6, 7, for example at a height of 18 mm from the base 5, are end flanges 11 which face each other and are at a distance i of, for example, 8 mm from wall flanges 12.

Each wall flange 12 on the alignment rail 4 fits, with some play, between parallel, longitudinal flanges 13 and 14 on the vertical sidewalls 15 of the sliding rail 3. The sidewalls 15 of the sliding rail 3. The sidewalls 15 are connected by a base 16 forming therewith a U-shaped section with channel 17 opening downwards.

In the exemplified embodiment shown in FIG. 1, roller balls 19 are provided between the upper longitudinal flange 14 of the sliding rail and the neighboring end flanges 11 of the alignment rail 4 rollers 20 with rubber tires 21 are provided between the sliding rail 3 and the alignment rail 4.

Figure 3:
FIG. 3 is an enlargement of a detail from area III in FIG. 2.

As is shown more clearly in FIGS. 3 through 5 the downward facing surface 30 of the wall flanges 12 and the opposite lying surface 31 of the lower longitudinal flanges 13 have, as viewed in cross-section, hooks or teeth 32 and 33 formed thereon. The faces 34 and 35 of the teeth 32 and 33 facing sidewalls 7 and 15 respectively, run parallel to each other at a distance t apart.

FIGS. 4, 5 show the wall flanges 12 and the lower longitudinal flanges 13 to be of length b, approximately 4.3 mm, and of height c, approximately 3 mm, and also the distance f between the faces 34 on the wall flanges 12 and between the faces 35 of the longitudinal flanges 13 to be about 1.2 mm. The height u of the teeth 32 and 33 are 0.5 mm in this case.

FIG. 6 shows a cross section through the alignment rail 4 with curved bearing surface 22 of radius r where the sidewall 7 curves over at about 90° to become the end flange 11. The ratio of the radius q of the roller ball 19 to the radius of the bearing surface 22 is about 1:1 to 1:3.

The alignment rail 4 in FIG. 7 shows the interaction of the described toothed end flange 12 with its counterpart on the neighboring longitudinal flange 13. The ball bearings 19 are situated in this embodiment at a lower level than the paired teeth 12 and 13 between wall flange $11_u$ and the lower longitudinal flange $14_u$.

Both the sliding rail 3 and the alignment rail 4 with its angular section 10 are readily extruded preferably using a light metal, and can be mounted without difficulty.

If the upper sliding rail 3 is loaded excessively, beyond the normal load of passenger and seat, the pairs of teeth 11 and 14 or 32 and 33 engage in each other and prevent deformation of the rail alignment. In another exemplified embodiment, not shown here, where flanges 12 and 13 are formed without hook or tooth like projections, when overloading occurs the surfaces of the flanges still come together and act to prevent undue deformation.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A sliding rail arrangement for supporting a moveable seat in a motor vehicle comprising:
   a substantially U-shaped alignment rail secured to said motor vehicle wherein each leg of said substantially U-shaped alignment rail is provided with first and second spaced apart continuous flanges; and
   a substantially U-shaped sliding rail slidably received within said substantially U-shaped alignment rail wherein each leg of said U-shaped sliding rail is provided with third and fourth spaced apart continuous flanges extending toward and proximate to said first and said second continuous flanges respectively such that one of said first continuous flange and said third continuous flange is below the other so as to define a first pair of continuous flanges and one of said second continuous flange and said fourth continuous flange is below the other so as to define a second pair of continuous flanges wherein one of said first pair of continuous flanges and said second pair of continuous flanges define a bearing surface for receiving a bearing and the other of said first pair of continuous flanges and said second pair of continuous flanges abut each other when said sliding rail is overloaded.

2. A sliding rail arrangement according to claim 1 wherein said pair of continuous flanges which abut are provided with means that interlock.

3. A sliding rail arrangement according to claim 2 wherein said means which interlock are in the form of a plurality of projections.

4. A sliding rail arrangement according to claim 3 wherein said projections are provided with an upright face facing the legs of said alignment rail and said sliding rail.

5. A sliding rail arrangement according to claim 1 wherein one of the legs of said alignment rail is provided with an L-shaped projection.

6. A sliding rail arrangement according to claim 1 wherein the rails are made of aluminum.

* * * * *